United States Patent
Anvari

(10) Patent No.: US 9,596,901 B1
(45) Date of Patent: *Mar. 21, 2017

(54) HELMET WITH WIRELESS SENSOR USING INTELLIGENT MAIN SHOULDER PAD

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

( * ) Notice: Subject to any disclaimer, the term of this patent is extended or adjusted under 35 U.S.C. 154(b) by 555 days.

This patent is subject to a terminal disclaimer.

(21) Appl. No.: 13/695,000

(22) Filed: Jan. 25, 2013

(51) Int. Cl.
*A42B 3/04* (2006.01)
*G05B 1/01* (2006.01)

(52) U.S. Cl.
CPC .............. *A42B 3/046* (2013.01); *G05B 1/01* (2013.01)

(58) Field of Classification Search
CPC ......... A42B 3/046; A42B 3/121; A42B 3/125; G05B 1/01; A63B 2220/40; A63B 71/10; A63B 2220/53; A41D 13/018; H01H 35/14; A61B 5/6804; A61B 5/6895
See application file for complete search history.

(56) References Cited

U.S. PATENT DOCUMENTS

| | | | | |
|---|---|---|---|---|
| 4,977,623 A | * | 12/1990 | DeMarco ............. | A41D 13/018 2/456 |
| 5,287,562 A | * | 2/1994 | Rush, III ........................... | 2/413 |
| 5,390,367 A | * | 2/1995 | Rush, III ........................... | 2/462 |
| 5,546,609 A | * | 8/1996 | Rush, III ........................... | 2/413 |
| 5,790,947 A | * | 8/1998 | Dieringer ...................... | 455/345 |
| 5,886,739 A | * | 3/1999 | Winningstad ................. | 348/158 |
| 5,937,443 A | * | 8/1999 | Kageyama ........... | A41D 13/018 2/455 |
| 6,433,691 B1 | * | 8/2002 | Hilliard et al. ............ | 340/573.1 |
| 6,508,747 B1 | * | 1/2003 | Cook .............................. | 482/83 |
| 7,062,301 B1 | * | 6/2006 | Dieringer ................... | 455/569.1 |
| 7,203,525 B2 | * | 4/2007 | Dieringer ................... | 455/569.1 |
| 8,010,171 B2 | * | 8/2011 | Fettig et al. ............... | 455/575.2 |
| 8,127,373 B1 | * | 3/2012 | Fodemski .......................... | 2/413 |
| 8,510,869 B1 | * | 8/2013 | McCrady et al. ................. | 2/410 |
| 8,706,067 B1 | | 4/2014 | Anvari | |
| 8,891,696 B1 | | 11/2014 | Anvari | |
| 8,947,195 B1 | | 2/2015 | Anvari | |
| 9,007,217 B1 | | 4/2015 | Anvari | |
| 9,075,405 B1 | | 7/2015 | Anvari | |
| 9,076,325 B1 | | 7/2015 | Anvari | |
| 9,262,910 B1 | | 2/2016 | Anvari | |

(Continued)

*Primary Examiner* — Firmin Backer
*Assistant Examiner* — Nay Tun

(57) ABSTRACT

A helmet with wireless sensor system for monitoring of surrounding objects. The helmet with wireless sensor system comprises a wireless sensor transceiver with a number of patch antennas to transmit a particular signal and receive reflected signals from surrounding objects; a processing unit located in a main shoulder pad communicating through radio frequency with a helmet uses the information from reflected signal received by wireless sensor transceiver to calculate the speed, distance, and direction of the object to determine when and where an impact will occur; and a number of inflatable/deflatable pads installed on the helmet and external to the helmet that will be activated prior to an impact.

7 Claims, 3 Drawing Sheets

(56) References Cited

U.S. PATENT DOCUMENTS

| | | | |
|---|---|---|---|
| 2005/0177929 A1* | 8/2005 | Greenwald et al. | 2/425 |
| 2012/0131718 A1* | 5/2012 | Uchida | A41D 13/018 2/69 |
| 2012/0306641 A1* | 12/2012 | Howard et al. | 340/539.11 |
| 2013/0060168 A1* | 3/2013 | Chu et al. | 600/595 |
| 2013/0066448 A1* | 3/2013 | Alonso | 700/91 |
| 2013/0099943 A1* | 4/2013 | Subramanya | G01S 7/2926 340/933 |
| 2013/0127638 A1* | 5/2013 | Harrison | 340/903 |

\* cited by examiner

HELMET WITH WIRELESS SENSOR USING INTELLIGENT MAIN SHOULDER PAD

BACKGROUND

A concussion is an injury to the brain. The brain does not work right for a while after a concussion. One may have problems with things like memory, balance, concentration, judgment, and coordination. The brain will need time to heal after a concussion. Most will have a full recovery with the proper rest and monitoring.

A concussion is caused by a sudden, violent jolt to the brain. It may be caused by:
A blow to the head
Severe jarring or shaking—like a bad fall
Abruptly coming to a stop—most common in car accidents
Concussions most often occur with events that involve:
  Motor vehicles
  Bicycles
  Skates, skateboards, and scooters
  Sports and recreation
  Falling down
  Firearms
  Physical violence such as
    Assault and battery
    Domestic violence
    Child abuse Traumatic brain injury or concussions occur when the head sustains a blunt and powerful force. Though typically it is not the impact or bruising that causes the neurotrauma. It is the rapid motion of the head. When the head is spun violently or sent into a state of rapid acceleration followed by an abrupt stop, brain neuron functions are disrupted. In CTE (Chronic traumatic encephalopathy), this disruption has caused "Tau" proteins—structures commonly found in neurons—to progressively amass to toxic levels and form tangled structures within the brain. As a result, electrical signaling between neurons is diminished and the brain's ability to process and retain information becomes increasingly impaired. Emotional disorders such as dementia and depression may also ensue.

Historically, research on TBI (Traumatic Brain Injury) and CTE has focused on amateur and professional athletes. Initially diagnosed in boxers who had sustained multiple concussions in the ring, CTE is commonly associated with contact sports such as football, wrestling and ice hockey (in addition to boxing). Now, however, researchers are making a similar association between blast neurotrauma and CTE in U.S. military veterans who have served in war.

Over the last few years, safety concerns regarding football helmets and concussions have become a most pressing issue. Safety issues in football are now ubiquitous, ranging from increased safety measures in the NFL to academics rating the best football helmets. And now legislation is spreading across America aimed at treating student-athletes with concussions.

Football helmet manufacturers are very aware of this, which is why they have created the most innovative and advanced helmets the sport has ever seen. Helmets have radically transformed over the last 10 years into engineering marvels.

The drive to minimize head injuries in sports is stronger than ever, especially in football. The NFL, recognizing the importance, has put stricter player-safety rules and policies in place—but technology is catching up to offer preventive methods to combat the issue.

As described above, traumatic brain injury or concussions occur when the head sustains a blunt and powerful force that results in violent spun of the head or sending the head into a state of rapid acceleration followed by an abrupt stop. When this happen brain neuron functions are disrupted. Helmets are useful as safety gear to prevent brain injuries in an uncontrolled environment. If one can't prevent a crash or impact, but knows it will occur, a helmet can prevent or minimize injury to the head and brain. No helmet can protect against all possible impacts, and the impact may exceed the helmet's protection. No helmet protects any part of the body that it does not cover, so even if the head injury is minimized one may have a smashed face, broken bones or worse.

Standards define laboratory tests for helmets that are matched to the use intended. If a helmet can pass the tests for a sport or activity, it provides adequate impact protection. A construction helmet will not pass the more severe bicycle helmet tests. A bicycle helmet will not pass the more severe motorcycle helmet tests. None of them provides the protection against shrapnel that is required of a military helmet. Standards also define other tests for such parameters as strap strength, shell configuration, visor attachments, and the head coverage that must be provided, depending on the activity.

Helmets designed to handle major crash energy generally contain a layer of absorbable pad. When one crashes and hit a hard object, the pad part of a helmet crushes, controlling the crash energy and extending the head's stopping time by about few thousandths of a second to reduce the peak impact to the brain. Rotational forces and internal strains are likely to be reduced by the crushing.

Thicker pad is better, giving the head more room and milliseconds to stop. If the pad is 15 mm thick it obviously has to stop you in half the distance of a 30 mm thick pad. Basic laws of physics result in more force to the brain if the stopping distance is shorter, whatever the "miracle" pad may be. Less dense pad can be better as well, since it can crush in a lesser impact, but it has to be thicker in order to avoid crushing down and "bottoming out" in a harder impact. The ideal "rate sensitive" pad would tune itself for the impact, stiffening up for a hard one and yielding more in a more moderate hit.

If the helmet is very thick, the outer circumference of the head is in effect extended. If the helmet then does not skid on the crash surface, that will wrench the head more, contributing to strain on the neck and possibly to rotational forces on the brain. In short, there are always tradeoffs, and a super-thick helmet will probably not be optimal. It will also fail on consumer acceptance.

If there are squishy fitting pads inside the helmet they are there for comfort, not impact. The impact is so hard and sharp that squishy pad just bottoms out immediately. In most helmets a smooth plastic skin holds the helmet's pad together as it crushes and helps it skid easily on the crash surface, rather than jerking your head to a stop. In activities that involve forward speed on rough pavement, rounder helmets are safer, since they skid more easily. The straps keep the helmet on the head during the crash sequence. A helmet must fit well and be level on the head for the whole head to remain covered after that first impact.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
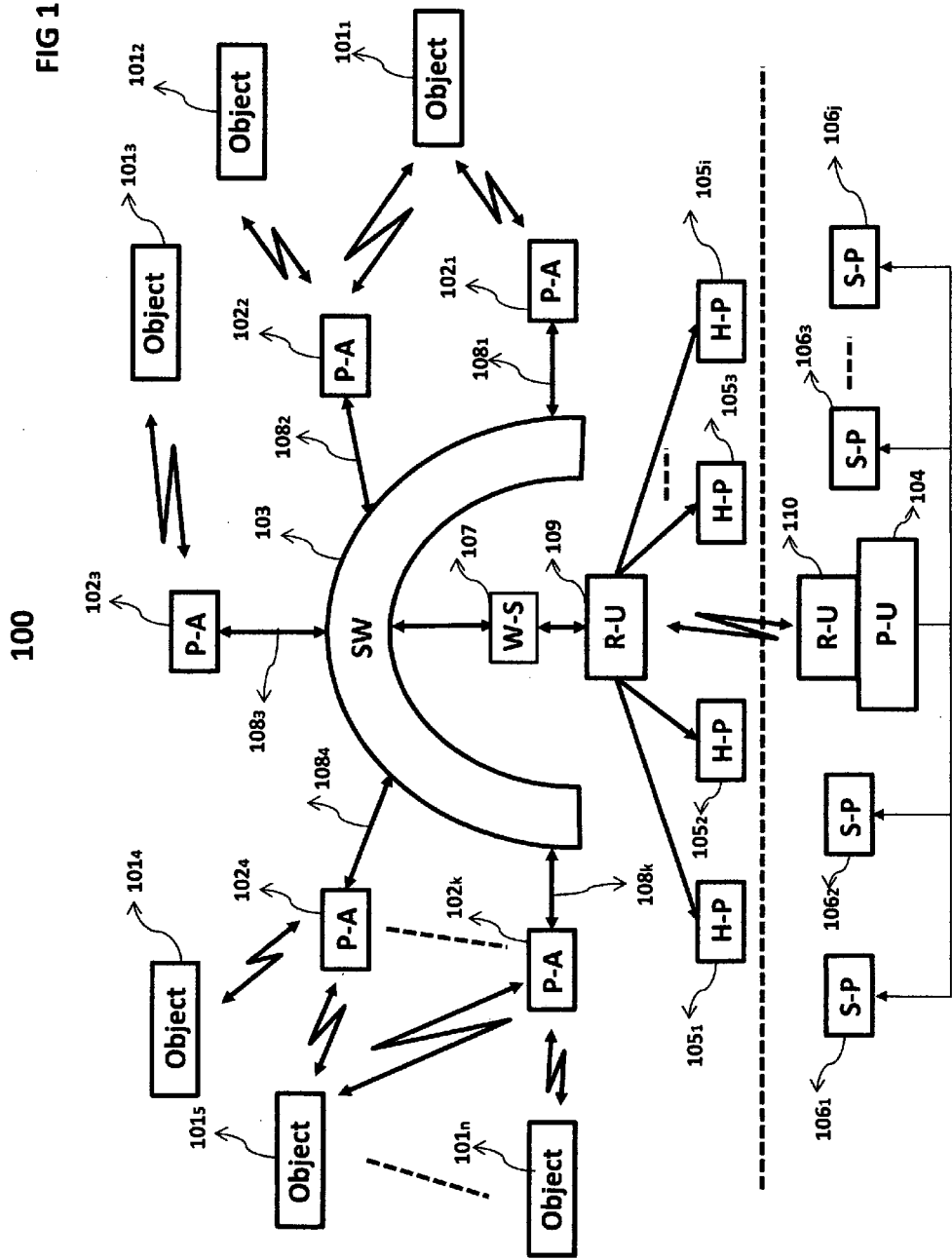
FIG. 1 illustrates an embodiment of a wireless sensing system with intelligent shoulder pad.

FIG. 1 depicts an embodiment of wireless sensing system 100. In general, wireless sensing system 100 facilitates in the providing of information, to a processing unit (P-U) 104, from radio unit 109, radio unit 110, wireless sensor (W-S) 107 through a switch (SW) 103 and patch antenna (P-A) $102_1$-$102_k$. For example, processing unit 104 requests information from the wireless sensor 107 through radio units 109 and 110. In response to the request, wireless sensor 107 through switch 103, transmission lines $108_1$-$108_k$ and patch antennas $102_1$-$102_k$ provides the requested information to the processing unit 104 using radio units 109 and 110. In various embodiments, the wireless sensor 107 provides raw information such as but not limited to, distance of objects $101_1$-$101_n$ from patch antennas $102_1$-$102_k$, speed of objects $101_1$-$101_n$ towards patch antenna $102_1$-$102_k$. It should be appreciated that wireless system 100 is time division multiplexed.

Wireless sensor system 100 includes, among other things, processing unit 104, radio units 109 and 110, switch 103, wireless sensor 107, transmission line $108_1$-$108_k$, patch antenna $102_1$-$102_k$, Helmet pads (H-P) $105_1$-$105_i$, shoulder pads (S-P) $106_1$-$106_j$, and objects $101_1$-$101_n$.

In one embodiment, radio unit 109, switch 103, wireless sensor 107, transmission lines $108_1$-$108_k$ and patch antenna $102_1$-$102_k$ are components of wireless system 100 that could reside on the Helmet and these components provides activation signal to the Helmet pads $105_1$-$105_i$. For example, helmet pad $105_2$, through wireless system 100, is activated to provide protection. In various embodiments, the pads can be Helmet pads that are attached to Helmet or pads that are attached to shoulder pad.

In one embodiment processing unit 104, radio unit 110 and shoulder pads $106_1$-$106_j$ are components of wireless system 100 that could reside on the shoulder pad. Processing unit 104 provides activation signal to shoulder pads and communicate with helmet using radio unit 110.

Processing unit 104 is for processing information received from wireless sensor 107 through radio units 109 and 110, switch 103, transmission lines $108_1$-$108_k$ and patch antenna $102_1$-$102_k$. Processing unit 104 typically utilizes appropriate hardware and software algorithm to properly process the information.

In one embodiment, the helmet 111 communicates with main shoulder pad 112 wirelessly using RF transceivers 109, and 110. For example, helmet pad $105_2$ is activated from processing unit 104 using RF transceiver 109.

Wireless sensor can be any wireless transceiver that is able to wirelessly transmit communication signals, such as short coded pulses. Wireless sensor is disposed on any physical platform that is conductive to effectively transmit the signals. For example, is disposed on inner shell of a Helmet.

In various embodiments, all communication to and from the wireless sensor 107 passes through the switch 103. For example, the switch 103 through processing unit 104 radio units 109 and 110 is configured to communicate through transmission lines $108_1$-$108_k$ to one of the patch antenna $102_1$-$102_k$ only for a specified period of time. For example, processing unit 104 requests information from the wireless sensor 107 through radio units 109 and 110 by configuring switch 103 to communicate through transmission line $108_1$ with patch antenna $102_1$. The request is received by the wireless sensor 107 is in form or an activation signal for a specified period of time. Upon receipt of activation signal, the wireless sensor 107 transmits signals through switch 103, transmission lines $108_1$-$108_k$ and patch antenna $102_1$-$102_k$ to surrounding objects $101_1$-$101_n$. A portion of transmitted signal reflects from objects $101_1$-$101_n$. The reflected signals from objects $101_1$-$101_n$ are received by wireless sensor 107 through patch antennas $102_1$-$102_k$ and switch 103 and then sent to processing unit 104 through radio units 109 and 110. In particular the processing unit 104 receives the information (in the form of reflected signal from objects $101_1$-$101_n$) via wireless sensor 107.

In one embodiment, communications through wireless network 100 are selected by switch 103. Switch 103 can be, but is not limited to, a one to k port switch. In general switch 103 at any specified period of time connects processing unit 104 and wireless sensor 107 to one of patch antenna $102_1$-$102_k$. It is commonly used as transmitter or receiver between processing unit 104 and patch antenna $102_1$-$102_k$.

In one embodiment, communication between processing unit 104 and wireless transceiver 107 is done wirelessly by radio units 109 and 110. Wireless units 109 and 110 can be, but are not limited to RF transceivers. In general RF transceivers 109 and 110 transmit data information from processing unit 104 to wireless transceiver 107 and control information to helmet pads $105_1$-$105_i$.

In one embodiment, communication through wireless network 100 is transmitted by one of patch antenna $102_1$-$102_k$. In general at any specified period of time one of the patch antennas $102_1$-$102_k$ is selected by switch 103 for transmission and reception. Each one of patch antennas $102_1$-$102_k$ can comprise of one transmit and one receive antenna. Transmit and receive patch antennas are physically separated to provide sufficient isolation between transmit and receive patch antennas.

In one embodiment, communication through wireless network 100 is transmitted by one of patch antenna $102_1$-$102_k$. In general at any specified period of time one of the patch antennas $102_1$-$102_k$ is selected by switch 103 for transmission and reception. Each one of patch antennas $102_1$-$102_k$ can comprise of one antenna only. Transmit and receive selection is performed by wireless transceiver 107.

Processing unit 104 has a variety of functions. In general, processing unit 104 is utilized for signal processing, calculation, estimation, activities, methods, procedures, and tools that pertain to the operation, administration, maintenance, and provisioning of wireless sensor network. In one embodiment, processing unit 104 includes a database that is used for various applications. The database can be utilized for analyzing statistics in real-time. Such statistics can be related to number of impacts, severity of impacts, number of Helmet pads and shoulder pads, and any other available statistics.

Processing unit 104 also has a variety of thresholds, such as, but not limited to, distance of object before Helmet pads activation, distance of object before shoulder pads activation, wireless sensor activation time, distance before any impact, pulse signal width, etc. In general, processing unit 104 provides controls to various components that are connected to it. Moreover, processing unit 104 is a high capacity communication facility that connects primary nodes.

In one embodiment, received information from wireless sensor 107 is used in processing unit 104. As such, processing unit 104 will utilize the received information to calculate the distance, speed and direction of object $101_1$-$101_n$. The processing unit 104 then uses the calculated information and various thresholds stored in its data base to activate one of the Helmet pads $105_1$-$105_i$ and/or one of the shoulder pads $106_1$-$106_j$ before an impact occurs.

In one embodiment the processing unit 104 activates one or more of helmet pads $105_1$-$105_i$ and shoulder pads $106_1$-$106_j$. Both helmet pads $105_1$-$105_i$ and shoulder pads $106_1$-$106_j$ are inflatable/deflatable pads, pillows and elastic bands to prevent rotational acceleration, by stiffening the movement of the head through stabilization technique just before impact. Both helmet pads $105_1$-$105_i$ and shoulder pads $106_1$-$106_j$ will also act as a shock absorber when at impact, making them reducing the impact as well as rotational acceleration.

In one embodiment the wireless sensor 107 is a transceiver that periodically switches between transmission and reception. During transmission a signal is transmitted and during the reception period the reflected signals from the objects $101_1$-$101_n$ are received. The received signal by patch antennas $102_1$-$102_k$, transmission lines $108_1$-$108_k$, is then sent to processing unit 104 through, wireless sensor 107, switch 103, and radio units 109 and 110 for further processing.

In one embodiment the wireless sensor 107 is microwave, or milimetric wave transceiver. The wireless sensor 107 could be connected to the switch 103 via a transmission line.

In one embodiment wireless sensor 107 is controlled by processing unit 104. The processing unit 104 controls transmit pulse width and number of times a pulse is transmitted by wireless sensor 107. Processing unit 104 also coordinates the transmit time and receive time period for the wireless sensor 107.

In one embodiment wireless sensor 107 is connected to patch antenna $102_1$-$102_k$ through switch 103 and transmission lines $108_1$-$108_k$. The transmission lines $108_1$-$108_k$ are coaxial, micro strip, or strip lines.

Figure 2:
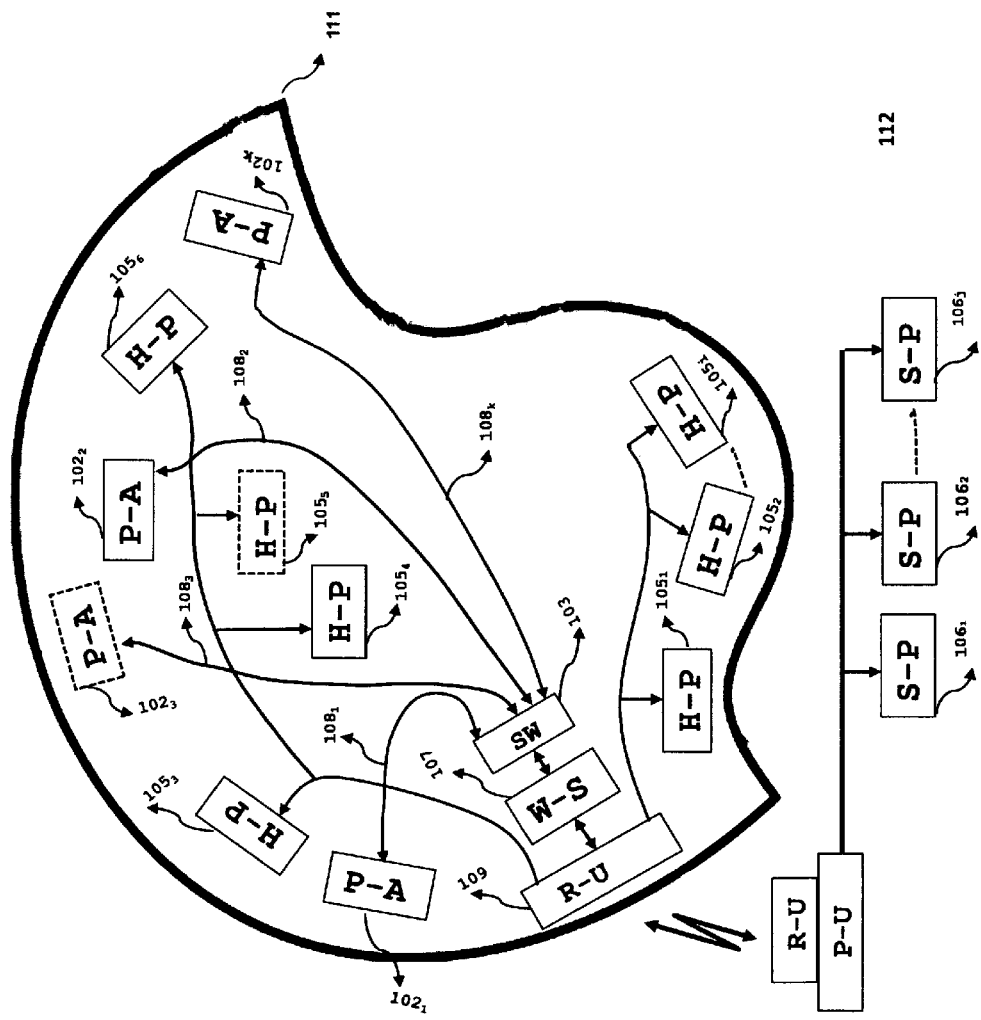
FIG. 2 illustrate embodiments of a helmet with wireless sensing sensor.

FIG. 2 depicts an embodiment of helmet wireless sensor system 200 comprising of a helmet 111 and main shoulder pad 112. In one embodiment, helmet wireless system 200 comprises of an intelligent wireless sensing system 100 as shown in FIG. 1. In general, helmet wireless system 200 is configured for facilitating in the monitoring/detection of possible collision by any object. In particular, helmet wireless system 200 is able to process a high volume of data and control various pads to minimize the effect of collision impact. In one embodiment helmet wireless system 200 is capable of providing protection that requires for all sorts of collision impacts.

In one embodiment, helmet wireless sensor 200 is implemented in line with wireless sensor system 100. In another embodiment, pluralities of patch antennas are disposed at various locations in wireless sensor system 100 for facilitating in the monitoring/detection of a possible impact.

Helmet 111 includes radio unit 109, switch 103, wireless transceiver 107, transmission lines $108_1$-$108_k$, patch antenna $102_1$-$102_k$, and helmet pads $105_1$-$105_i$.

Main shoulder pad 112 includes processing unit 104, radio unit 109, and shoulder pads $106_1$-$106_j$.

The processing unit 104 on main shoulder pad 112 communicate with shoulder pads 106-$106_j$. A physical connection between processing unit 104 and shoulder pads 106-$106_j$ wilt facilitate this communication.

In one embodiment, the processing unit 104 on main shoulder pad 112 communicates with helmet pads $105_1$-$105_i$. Wireless connection using radio units 109 and 110 between main shoulder pad 112 and helmet 111 facilitate this communication.

In one embodiment, the processing unit 104 on main shoulder pad 112 communicates with helmet wireless transceiver 107. Wireless connection using radio units 109 and 110 between main shoulder pad 112 and helmet 111 facilitate this communication.

In one embodiment the patch antenna $102_1$-$102_k$ are installed at location on helmet to provide most effective information for processing unit 104. Processing unit 104 will use this information to estimate location, speed and direction of objects with high accuracy The helmet pads $105_1$-$105_i$ are installed at locations on helmet 111 to provide the most effective protection from an impact. Processing unit 104 will activate one or more of the helmet pads $105_1$-$105_i$ prior to impact once a potential impact is detected.

The shoulder pads $106_1$-$106_j$ are installed at locations on main shoulder pad 112 to provide the most effective protection from an impact. Processing unit 104 will activate one or more of the shoulder pads $106_1$-$106_j$ prior to impact once a potential impact is detected.

Processing unit 104 is configured to receive the pertinent information and to determine whether the helmet is going to experience a possible impact from an external object based at least in part on the pertinent information provided by the wireless sensor 107. For example, processing unit 104 executes an algorithm (e.g., impact determination algorithm) that utilizes the pertinent information to determine whether or not an external object $101_1$-$101_n$ is approaching the helmet wireless sensor 200. In various embodiments, processing unit 104 is a multicore CPU, DSP, or FPGA.

Figure 3:
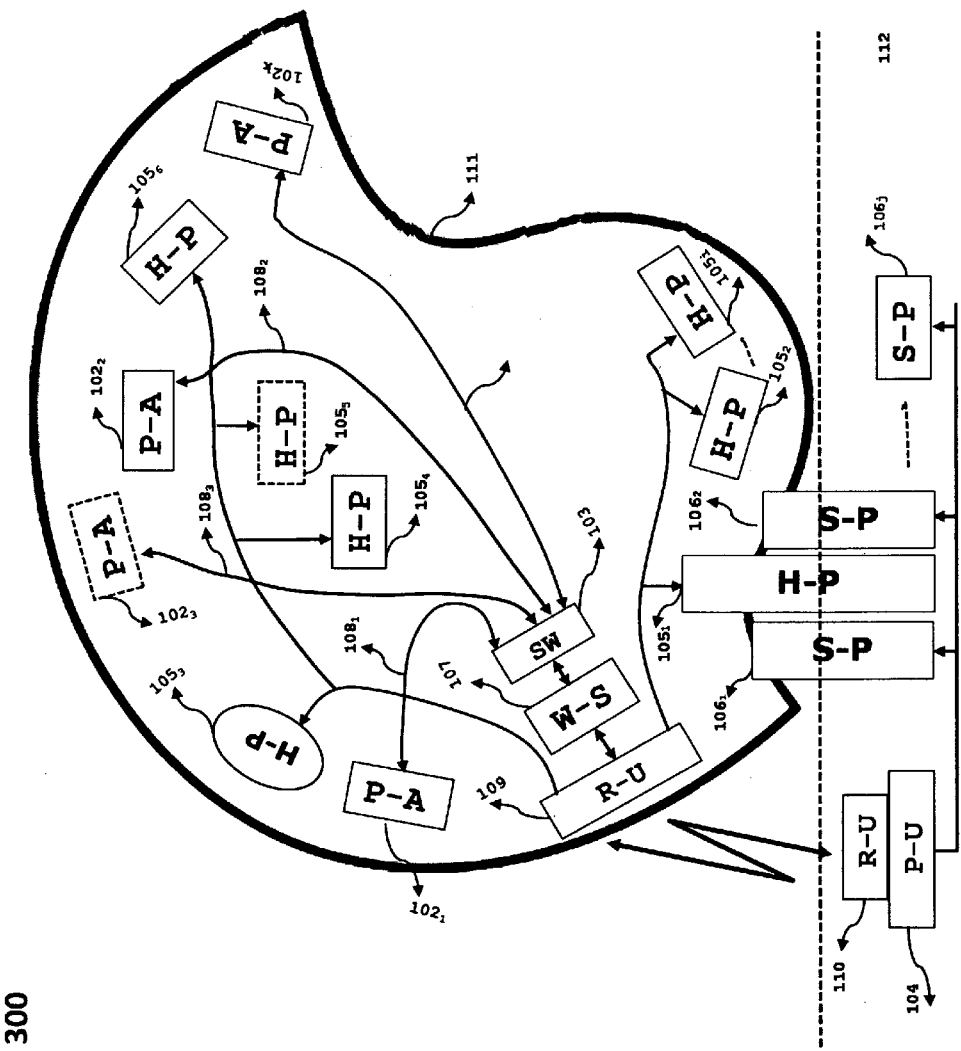
FIG. 3 illustrates embodiment s of a method for minimizing and protecting the head movement using a wireless sensing system.

FIG. 3 depicts an embodiment of helmet wireless system 300. In one embodiment, helmet wireless system 300 is similar to helmet wireless system 200. For instance, helmet wireless system 300 includes main shoulder pad 112 and helmet 111.

In one embodiment, helmet wireless system 300 shows a scenario after an impact from an external object. For example helmet wireless system 300 shows activation of some of the helmet pads $105_1$-$105_i$, and some of shoulder pads $106_1$-$106_j$.

In one embodiment, helmet wireless system 300 shows a scenario after an impact from an external object. For example helmet wireless system 300 shows activation of some of the helmet pads $105_1$-$105_i$. One of the helmet pads $105_3$ is activated and inflated to absorb the impact force.

In one embodiment, helmet wireless system 300 shows a scenario after an impact from an external object. For example helmet wireless system 300 shows activation of some of the helmet pads $105_1$-$105_i$. Helmet wireless system 300 shows activation of helmet pad $105_1$ to hold head steady and avoid any violent movement of head.

In one embodiment, helmet wireless system 300 shows a scenario after an impact from an external object. For example helmet wireless system 300 shows activation of some of the shoulder pads $106_1$-$106_j$. Helmet wireless system 300 shows activation of helmet pads $106_1$, and $106_2$ to hold head steady and avoid any violent movement of head.

Various embodiments are thus described. While particular embodiments have been described, it should be appreciated that the embodiments should not be construed as limited by such description, but rather construed according to the following claims.

The invention claimed is:

1. A helmet armed to monitor surrounding environment of the helmet, to detect an impact from an object and to activate protection comprising:
    inflatable pads;
    a transceiver mounted on a shell of the helmet to transmit a signal and detect the signal from surrounding environment comprising:
    a plurality of patch antennas mounted at various locations on the helmet;
    a switch mounted on the helmet to select the patch antennas for transmission and reception;
    a plurality of transmission lines to connect the switch to the patch antennas;
    the transceiver using the patch antennas to transmit the signal, which is a coded signal, generated in a control processor located on a shoulder pad where data information is stored;
    the transceiver using the patch antennas to receive the signal from surrounding environment, to detect the signal from the object in surrounding environment and send data information of the detected signal to the control processor on the shoulder pad;
    a radio communication device mounted on the helmet to facilitate communication of the data information of the detected signal between the transceiver and the control processor on the shoulder pad where the data information of the detected signal is processed to determine when and which inflatable pads need to be activated.

2. The helmet of claim 1, wherein the control processor on the shoulder pad coordinates a transmit time and a receive time for the transceiver on the helmet, activates the transceiver and the switch, generates and sends the coded signal to the transceiver for transmission, receives the data information of the detected signal from the object, calculates and estimates a distance and an approaching speed of the object, and activates the inflatable pads.

3. The helmet of claim 1, wherein the control processor on the shoulder pad uses a radio communication device on the shoulder pad to communicate with the radio communication device on the helmet.

4. The helmet of claim 1, wherein the transceiver is connected to the plurality of patch antennas via the switch and the plurality of transmission lines using at least one of stripline line, microstrip line, or coaxial line technologies.

5. The helmet of claim 1, wherein the inflatable pads are installed on the helmet and the shoulder pad.

6. The helmet of claim 1, wherein the switch simultaneously connects the transceiver to one or more patch antennas.

7. The helmet of claim 1, wherein the transceiver is time multiplexed for transmission and reception.

* * * * *